United States Patent [19]
Kaseda et al.

[11] Patent Number: 5,249,119
[45] Date of Patent: Sep. 28, 1993

[54] APPARATUS FOR AND METHOD OF DETECTING A MALFUNCTION OF A CONTROLLER

[75] Inventors: Shigeru Kaseda; Koichi Takahashi, both of Chita; Toshihiko Niinomi, Hiroshima; Ryohei Funakoshi, Tokyo, all of Japan

[73] Assignees: Idemitsu Kosan Company Limited; Mitsubishi Jukogyo Kabushiki Kaisha, both of Tokyo, Japan

[21] Appl. No.: 691,526

[22] Filed: Apr. 25, 1991

[30] Foreign Application Priority Data

May 2, 1990 [JP] Japan .................................. 2-116150

[51] Int. Cl.$^5$ ......................... G05B 13/02; G05B 9/02
[52] U.S. Cl. ...................................... 364/185; 364/153
[58] Field of Search ............................. 364/184–185, 364/160–163, 153, 186–187; 371/47.1, 48

[56] References Cited

U.S. PATENT DOCUMENTS

| | | | |
|---|---|---|---|
| 3,566,241 | 2/1971 | Ross | 364/161 |
| 4,214,301 | 7/1980 | Kurihara et al. | 364/185 |
| 4,509,110 | 4/1985 | Levesque, Jr. et al. | 364/184 |
| 4,872,104 | 10/1989 | Holsinger | 364/161 |
| 4,885,676 | 12/1989 | Zweighaft | 364/184 |
| 4,999,557 | 3/1991 | Inoue | 364/161 |
| 5,072,357 | 12/1991 | Niessen et al. | 364/161 |

*Primary Examiner*—Jerry Smith
*Assistant Examiner*—Jim Trammell
*Attorney, Agent, or Firm*—Flynn, Thiel, Boutell & Tanis

[57] ABSTRACT

An deviation E between a setting value SV and an actual phase value PV in a controller is integrated, and the resulting integrated value S is compared with a predetermined threshold D for detecting a malfunction. Checking a change in setting value SV, checking an increase or a decrease in deviation E and comparison with the absolute value |E×S| are made to ensure stability against fluctuations and rapid detection of a malfunction.

10 Claims, 9 Drawing Sheets

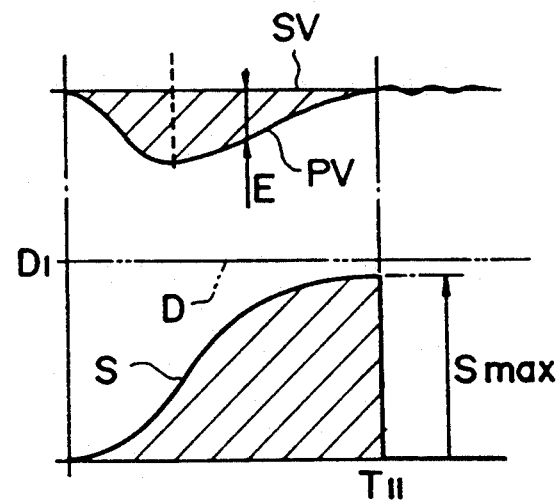
FIG.9(A)
FIG.9(B)
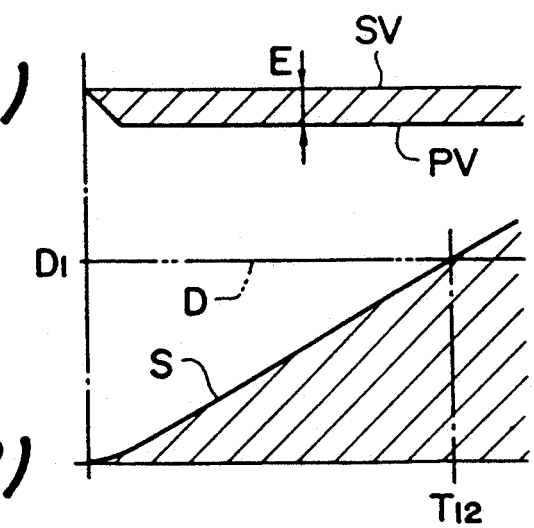
FIG.10(A)
FIG.10(B)

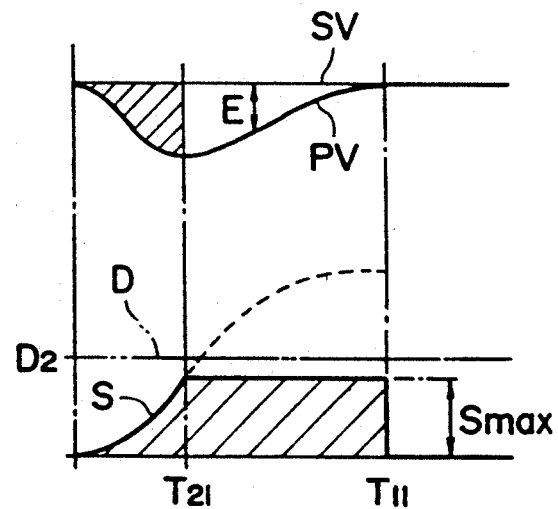
FIG. 11(A)
FIG. 11(B)
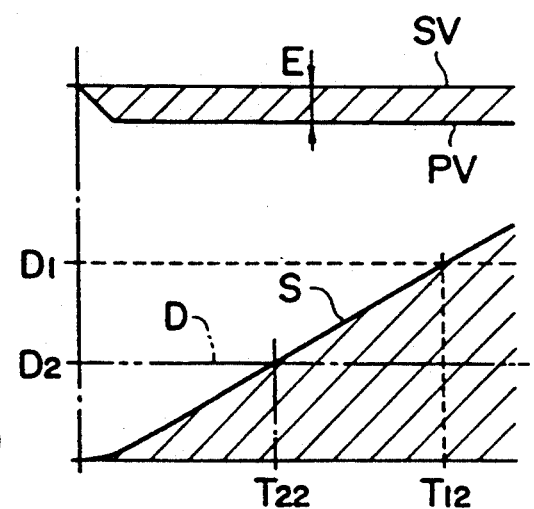
FIG. 12(A)
FIG. 12(B)

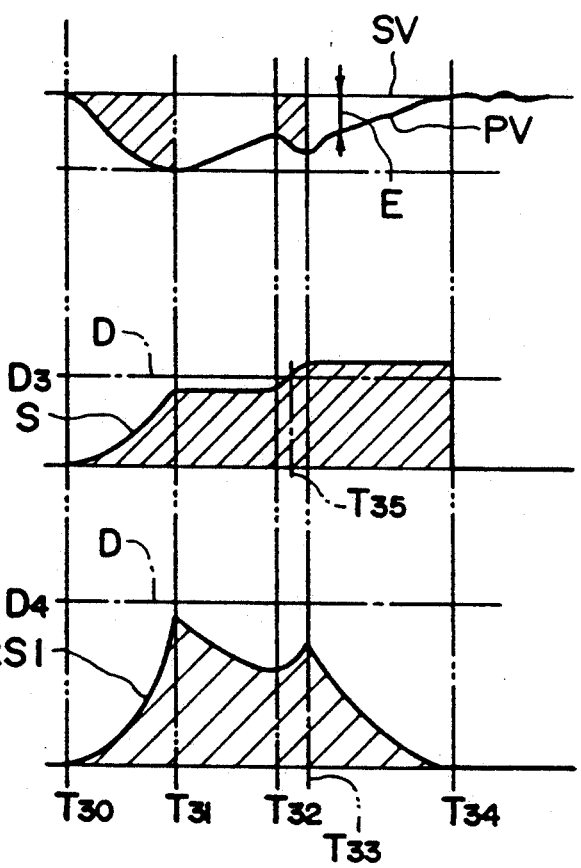

APPARATUS FOR AND METHOD OF DETECTING A MALFUNCTION OF A CONTROLLER

BACKGROUND OF THE INVENTION

1. Field of the Invention

The present invention relates to an apparatus for and a method of detecting a malfunction of a controlling unit for a petroleum, chemical or atomic power plant which performs an automatic operation using process control.

2. Description of the Related Art

Conventionally, process control is provided in chemical plants, etc., in order to maintain a process system including tower tanks and piping in a predetermined state. In ordinary process control, various phase values such as flow, level, temperature, pressure, etc., in the respective elements of the plant are measured by using many controlling units and flow control valves associated with the elements are adjusted to the corresponding setting values. If a trouble or malfunction occurs in part of such controlled system, it is difficult to control the entire system appropriately.

For example, there can occur a wrong indication or discrepancy between the phase value and indicated value of a controlling unit. The wrong indication does not immediately cause a fatal damage, but the phase value checked with the setting value will be incorrect to thereby make the correct adjustment of the entire system difficult.

Normally, if a setting value is A, then the phase value or indicated value will also be A. If there occurs a wrong indication in a controlling unit and the indicated value A' becomes A+a where a denotes an deviation, the controlled system operates so as to eliminate the deviation to thereby return the indicated value to the setting value A.

Such repeat of the operation to maintain the indicated value mechanical constant can finally lead to the occurrence of a malfunction where the regulator valve is completely closed.

Although the deviation eliminating operation of the controlled system returns the indicated value of the controlling unit to A=A'−a, the actual phase value is AΔ=A−a, which is maintained with the deviation a and different from the proper setting value A. If such deviation a continues to be maintained, malfunction can spread through the entire system.

In order to avoid such malfunction, the controlling units at the respective elements of the plant, etc., are required to be monitored also during operation of the plant, etc. Monitoring is performed visually by an operator. However, a wrong indication such as that mentioned above is difficult to visually recognize, so that automatic monitoring by a malfunction detector is performed.

To this end, malfunction detectors are used which detect an deviation between a setting value and the actual phase value and giving an alarm when such deviation has exceeded a predetermined threshold.

Since the deviation between the setting value and the phase value is calculated and the deviation is compared with the threshold in the malfunction detector each time the monitoring operation is performed, there is the problem that the deviation can not be detected as a malfunction until it increases to a predetermined value, and that a wrong alarm is given when a great fluctuation occurs.

In order to calculate the deviation, the difference in quantity between the supplied and discharged materials and the difference in quantity between the supplied and discharged heat may be used, but detection of the malfunction would be delayed when a small difference in quantity between the supplied and discharged materials is accumulated as in the level gauges of the tower tanks.

It is an object of the present invention to provide an apparatus for detecting a malfunction in a controlling unit which is capable of detecting a malfunction of the controlling unit rapidly and appropriately.

SUMMARY OF THE INVENTION

According to the present invention, an deviation between the setting value and the actual phase value in the controlling unit is integrated, and the integrated value is compared with a predetermined threshold to detect a malfunction. In integrating the deviations, a proximate integrating system generally used many times may be used. Alternatively, a simple accumulating system or a system which accumulates deviations in accordance with the respective states of the deviations at different times may be used.

Preferably, the setting values in the controlling units are monitored at constant intervals of time, and when the current setting values have changed to values different from the setting values in the previous cycle, the integration or comparison is omitted and excessive reaction to the changes in the current setting values should be avoided.

When the current deviation decreases compared to the deviation in the previous cycle, preferably, the integration is omitted, unnecessary malfunction detection is avoided, for example, when the fluctuations are suppressed to thereby improve the reliability and accuracy of control.

If the phase value and the setting value coincide, the deviations are 0 at the respective points in time and the integration of the deviations is maintained at 0. If the phase value differs from the setting value due to the occurrence of a malfunction such as a wrong indication in the controlling unit, the respective deviations are sequentially integrated.

If the deviations are temporary, the integrated value is maintained at the value of the deviations. If the deviation continues to occur, the integrated value rapidly increases with time.

Therefore, continuation of the deviation is securely and rapidly detected even if it is small because the occurrence of the malfunction is determined as such when the integrated value of the deviations has exceeded the predetermined threshold.

No temporary fluctuations are detected to thereby ensure appropriate determination of a malfunction. Thus the above object is achieved.

BRIEF DESCRIPTION OF THE DRAWINGS

FIGS. 9(A) and 9(B) are related graphs showing the operation of the embodiment when no increase or decrease in the deviation is interpreted when the indicated value fluctuates in an allowable range;

FIGS. 10(A) and 10(B) are related graphs showing the operation of the embodiment when no increase or decrease in the deviation is interpreted when the indicated value continues to occur;

FIGS. 11(A) and 11(B) are related graphs showing the operation of the embodiment when an increase or decrease in the deviation is interpreted when the indicated value fluctuates in an allowable range;

FIGS. 12(A) and 12(B) are related graphs showing the operation of the embodiment when an increase or decrease in the deviation is interpreted when the indicated value continues to occur;

FIGS. 13(A) and 13(B) and 13(C) are related graphs showing indicative of the operation of each of the systems in the interpretation of a malfunction in the embodiment;

DETAILED DESCRIPTION OF THE PREFERRED EMBODIMENTS

Figure 1:
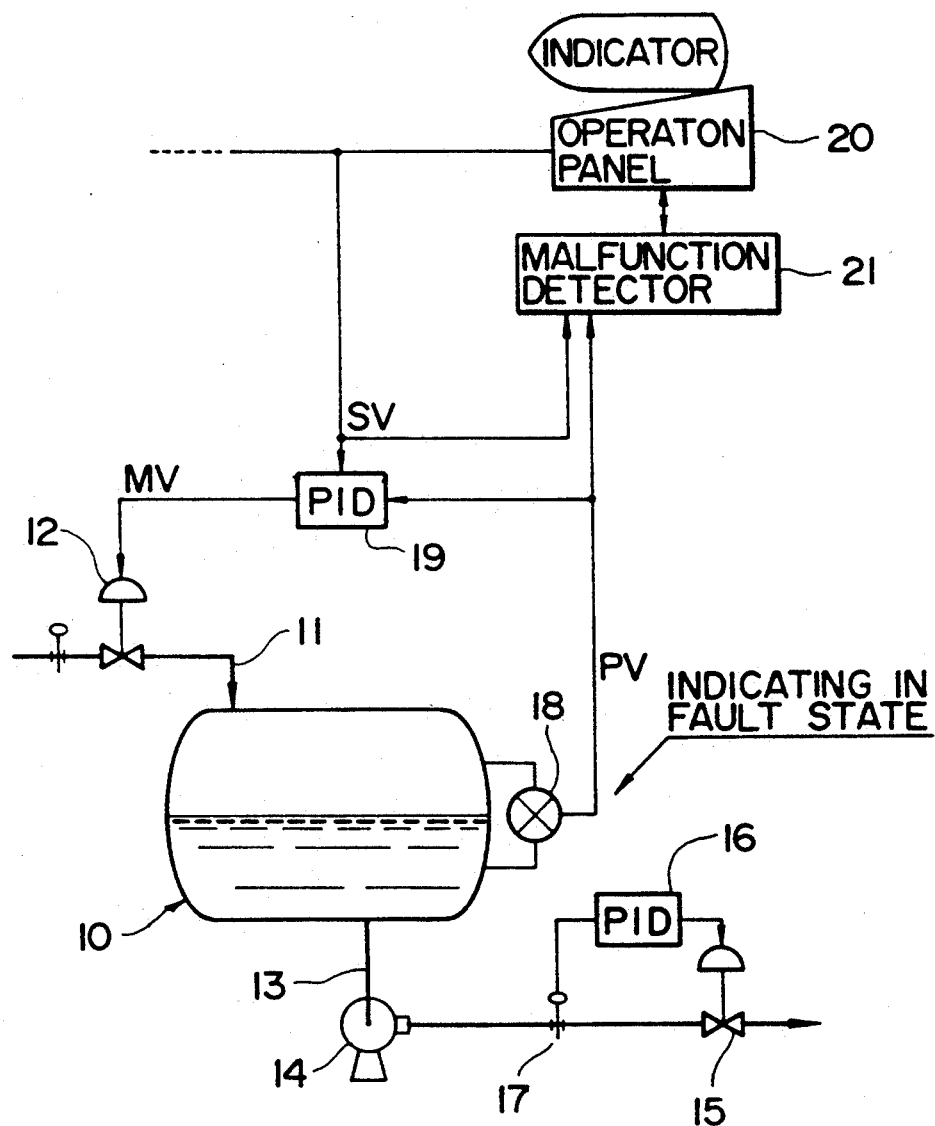
FIG. 1 is a circuit diagram of an embodiment of the present invention.

A preferred embodiment of the present invention will be described with reference to the drawings. In FIG. 1, an inlet pipe 11 with a flow control valve 12 is connected to a reaction vessel 10 of a chemical plant. An outlet pipe 13 with a discharge pump 14 and a flow control valve 15 is connected to reaction vessel 10. A PID (Proportional, Integral and Differential) controller 16 is connected to flow control valve 15 to adjust the degree of opening of control value 15 in accordance with the detected value from flowmeter 17 to maintain the flow through output pipe 13 constant.

Attached to reaction vessel 10 is a level gauge 18 the output of which is connected to controller 19. Controller 19 outputs to flow control valve 12 such a manipulated variable MV that the phase value PV (indicated valve) detected by level gauge 18 coincides with a setting value SV set externally to adjust the degree of opening of flow control valve 12 to adjust an intake flow from inlet pipe 11 to maintain the level of the liquid in reaction vessel 10 constant. The setting values at controller 19 are $P=30$, $I=2000s$ and $D=0s$.

An operation panel 20 is connected to controller 19 to externally set a setting value SV and a malfunction detector 21 according to the present invention connected to controller 19.

Figure 2:
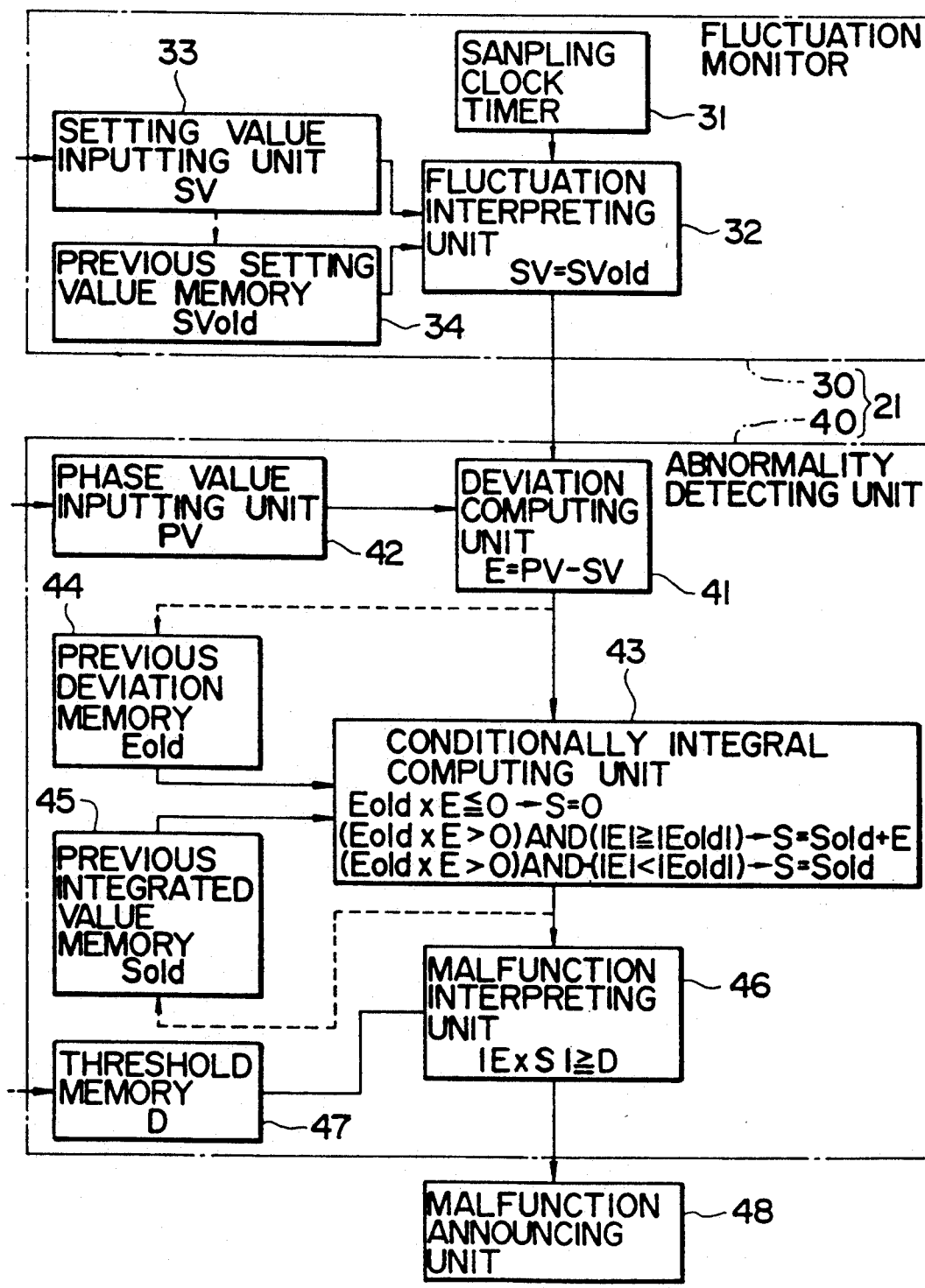
FIG. 2 is a block diagram of the essential portion of the embodiment.

As shown in FIG. 2, malfunction detector 21 includes a fluctuation monitor 30 and an abnormality detecting unit 40.

In fluctuation monitor 30, sampling clock timer 31 repeatedly starts up fluctuation interpreting unit 32 in constant cycles, for example, of 10 seconds.

Fluctuation interpreting unit 32 reads a setting value SV for controller 19 from setting value inputting unit 33, reads previous setting value SVold from previous setting value memory 34, and compares SV with SVold.

The output of input unit 33 is recorded in the previous setting value memory 34 each time fluctuation interpreting unit 32 completes its operation. The previous setting value SVold represents the setting value SV preceding one cycle.

Therefore, if the current setting value SV differs from the previous setting value SVold, the controller determines that the setting valve has been changed, terminates its operation and returns its standby state where it waits for the start of the next sample cycle. If the current and previous setting values are equal, the controller determines that no setting valve has been changed, and starts up abnormality detecting unit 40.

Abnormality detecting unit 40 includes a deviation computing unit 41, which reads the phase value PV of level gauge 18 from phase value inputting unit 42 at the start-up, calculates the deviation $E = PV - SV$ and delivers the deviation E to conditionally integral computing unit 43, which reads previous deviation Eold from previous deviation memory 44 and previous integrated value Sold from previous integrated value memory 45.

The outputs of computing units 41 and 43 are stored in memories 44 and 45, respectively, each time conditionally integral computing unit 43 completes its operation. Previous deviation and integrated values Eold and Sold represent the deviation E and integrated value S, respectively, preceding one cycle.

Computing unit 43 makes comparison $Eold \times E \leq 0$. If the condition $Eold \times E \leq 0$ holds or deviation value E and previous deviation value Eold differ in sign, it resets integrated value S to 0 by interpreting the deviation as being in a non-steady state range.

If $Eold \times E > 0$ or if the deviation value E and previous deviation value Eold have the same sign, it calculates the integrated value S by determining that the deviations of the same tendency continue to occur.

Computing unit 43 makes the comparison $|E| \geq |Eold|$ using the current and previous deviation values E and Eold.

If $|E| \geq |Eold|$, it determines that the deviation tends to increase and adds deviation E to previous integrated value Sold to output integrated value S.

If $|E| < |Eold|$, it determines that the deviation tends to decrease and maintains the previous integrated value Sold as it is and feeds deviation E together with the set integrated value S in the corresponding process to malfunction interpreting unit 46.

Malfunction interpreting unit 46 reads threshold D from threshold memory 47, calculates the absolute value $|E \times S|$ of the product of received integrated value S and deviation E, compares the result with the threshold D and starts up malfunction announcing unit 48 if the absolute value $|E \times S|$ equals or exceeds the threshold D.

Malfunction announcing unit 48 may include alarms provided around reaction vessel 10 or displays on operation panel 20.

The malfunction detector of the present embodiment performs the following operations.

Figure 3:
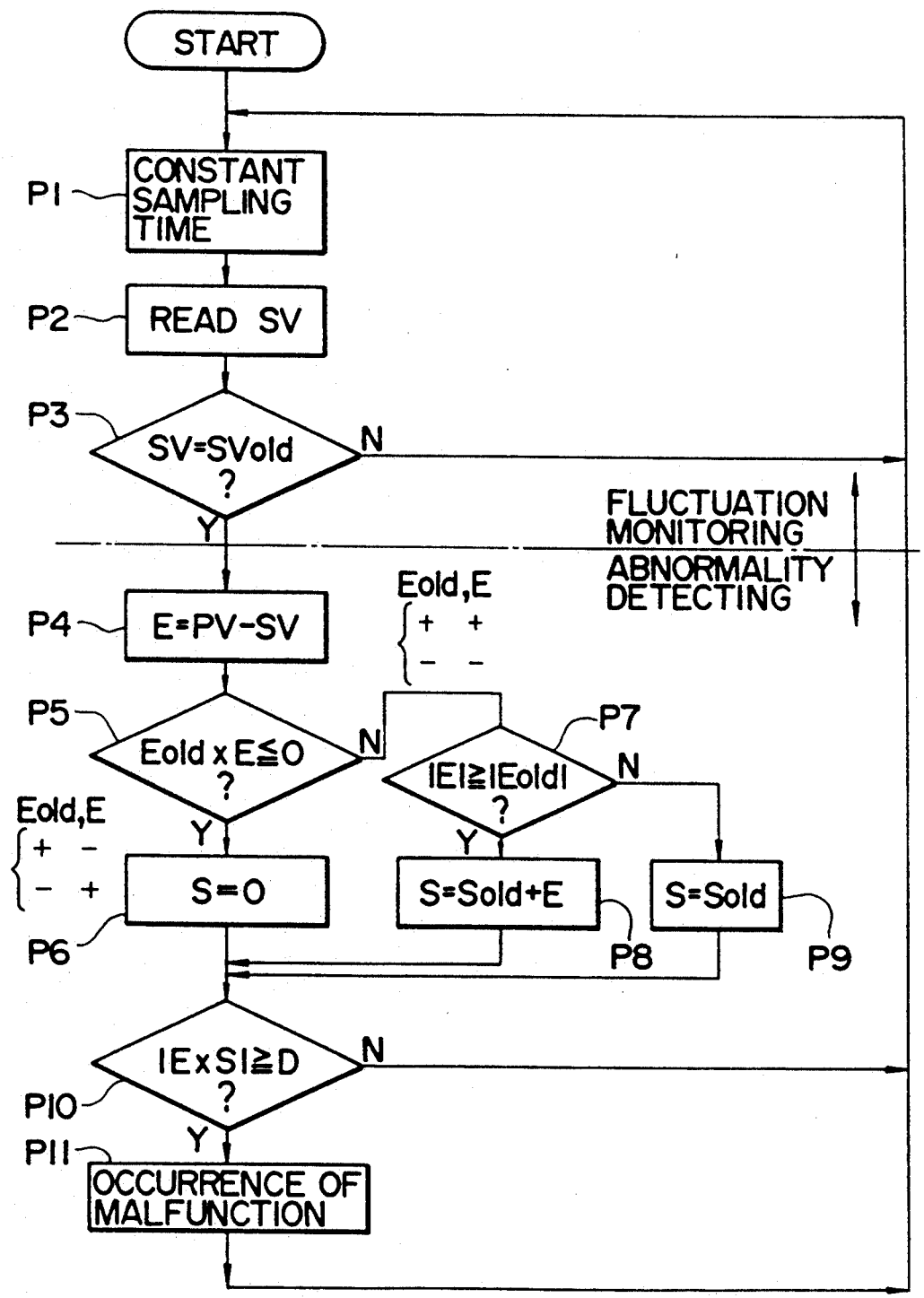
FIG. 3 is a flowchart indicative of the operation of the embodiment.
Figure 4:
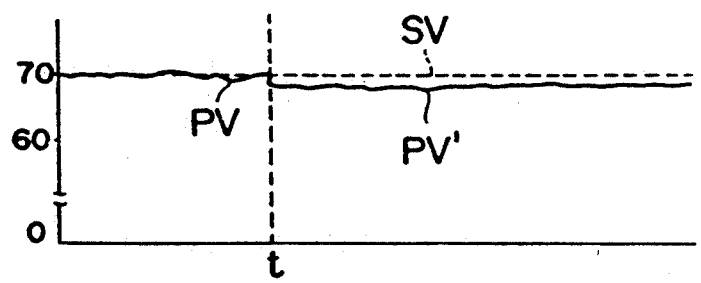
FIG. 4 is a graph of a wrong indication in the embodiment.

As shown in FIG. 3, malfunction detector 21 monitors fluctuations in each of the set values at constant cycles using fluctuation monitor 30. After a constant sampling time has passed (step P1), it reads set value SV (step P2), compares SV and SVold (step P3), and returns to its standby state if there is a change in set value SV (step P1).

If there is no change in the set value, abnormality detecting unit 40 detects a possible malfunction on the basis of the integrated value of the deviations. It calculates the deviation $E = PV - SV$ (step P4), checks whether deviation E continues to occur on the basis of $Eold \times E \leq 0$ (step P5) and resets the integrated value S to 0 if deviation E does not continue (step P6).

If E continues to occur, it checks an increase or decrease in the deviation on the basis of $|E| \geq |Eold|$ (step P7), calculates integration $S = Sold + E$ if the deviation increases (step P8), and sets the integrated value S to Sold if the deviation decreases (step P9).

Subsequently, it calculates the absolute value $|E \times S|$ of the product of integrated value S and deviation E, compares the result with threshold value D (step P10), returns to its standby state if the absolute value $|E \times S|$ is smaller than threshold value D (step P1), and announces the occurence of a malfunction when the absolute value $|E \times S|$ has exceeded threshold value D (step P11).

Referring to FIGS. 4–8, malfunction detection made when wrong indication occurs in level gauge 18 in the present embodiment will be described. In a normal state, the phase value and indicated value in level gauge 18 coincide and are maintained at the valve PV corresponding to set value SV by controller 19 (see FIG. 4).

Assume that wrong indication occurs at level gauge 18 at time t and that indicated value PV' becomes smaller than PV. This means that the seeming level PV in reaction vessel 10 has decreased to PV' and hence controller 19 increases a flow on the inlet side by deviation $PV' - PV$ in order to recover the decreased level to PV.

Figure 5:
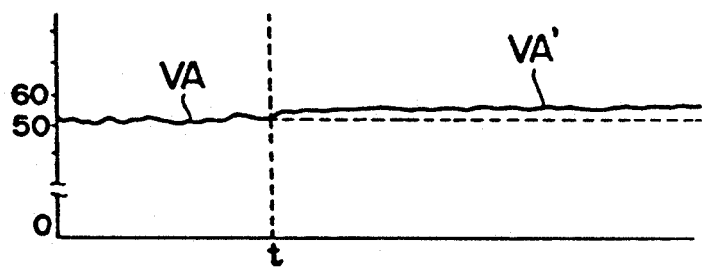
FIG. 5 is a graph showing opening-degree adjustment corresponding to the wrong indication in the embodiment.

Flow control valve 12 is maintained at a degree of opening a VA until time t while it is opened to a degree of opening of VA' by controller 19 after t (see FIG. 5).

Figure 6:
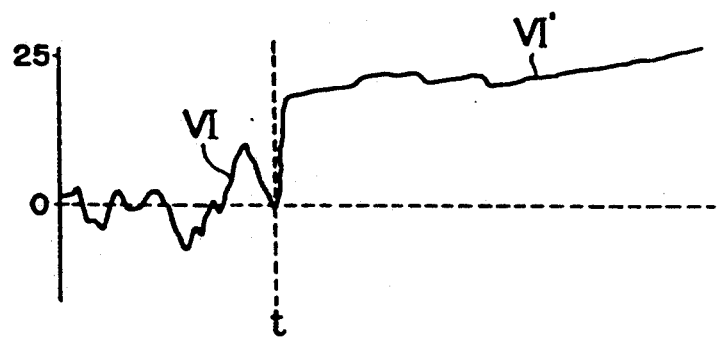
FIG. 6 is a graph of a change in the flow corresponding to the opening-degree adjustment in the embodiment.
Figure 7:
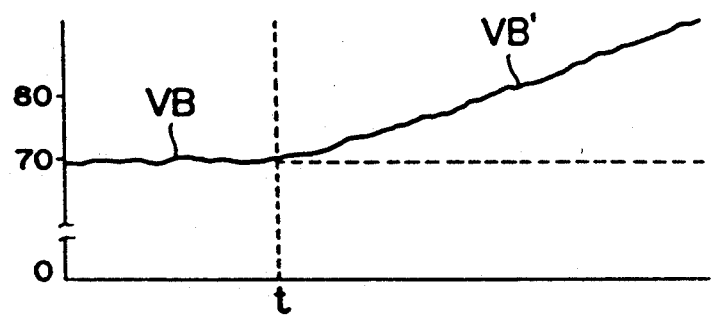
FIG. 7 is a graph of a change in the difference in quantity between the supplied and discharged materials corresponding to the opening degree adjustment in the embodiment.

Therefore, the intake flow VI per hour from inlet pipe 11 is maintained constant until time t and increases stepwise in accordance with the degree of opening of control valve 12 and changes to a flow VI' after t (see FIG. 6). A balance VB of materials flow passing through reaction vessel 10, represented by the difference in quantity between the supplied and discharged materials/the average flow through the inlet and outlet x %, is substantially constant until time t, while it gradually increases in accordance with an increase in the flow and the difference now designated by VB' increases monotonously after time t (see FIG. 7).

In order to detect such malfunction on the basis of the wrong indication, malfunction detector 21 of the present embodiment performs the operation shown in FIG. 3 on the basis of the change in the deviation from $E = PV - SV$ to $E' = PV' - SV$ due to the change from PV to PV' in the indicated value.

Figure 8:
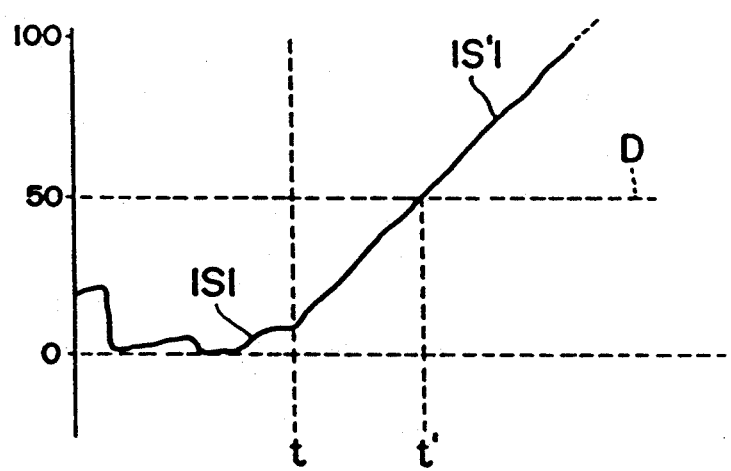
FIG. 8 is a graph of accumulation of the deviations in the malfunction interpretation in the embodiment.

As shown in FIG. 8, the indicated value PV is substantially equal to and fluctuates around the setting value SV in a small range until time t in the positive- and negative-going manner but with the deviation $E = PV - SV$ being substantially equal to 0. The integrated value S becomes 0 each time the sign of deviation E is inverted and, changes in the positive- and negative-going manner, but is substantially 0. The absolute value ISI on the basis of the integrated value S is very close to 0.

After time t, deviation $E' = PV' - SV < 0$ because indicated value $PV' <$ setting value SV. The integrated value S includes sequential accumulation of negative deviations E' and subsequent absolute value IS'I rapidly increases monotonously. Therefore, when the resulting value has exceeded threshold D at time t', malfunction is announced.

According to this embodiment, the following effects are produced.

Deviation E from setting valve SV is calculated corresponding to the change from PV to PV' due to wrong indication, and the integrated value S of the deviations is calculated, so that even if indicated value PV is small and constant, the integrated value S exhibits a marked change. Thus, comparison between integrated value S and threshold value D leads to rapid and secure detection of a malfunction.

Especially, if deviation E is solely detected and compared, deviation $E = PV' - SV$ due to wrong indication as mentioned above is substantially constant and difficult to detect while it is ensured that such deviation is detected by integration in the present embodiment.

For detection of a wrong indication such as mentioned above, detection of the change from VA to VA' in the degree of opening, the change from VI to VI' in the intake flow or the change from VB to VB' in the difference in flow between the supplied and discharged materials could be conceived in addition of the change in the indicated value from PV to PV'. In each of these detections, there is high correlation between level gauge 18 which can malfunction and the malfunction detector, the accuracy of detection is low and the element which malfunctions is difficult to locate. In the detection systems mentioned earlier, the degree of opening and the flow rate are difficult to detect accurately. Additional measuring devices are required for that detecting purposes.

In contrast, since the present embodiment directly uses the indicated value PV in level gauge 18 and the setting value SV in controller 19, secure detection of a malfunction is ensured even in each of the various detections mentioned above.

Since fluctuation monitor 30 monitors setting value SV in constant cycles and omits further processing after the current value changed from the value in the previous cycle, excessive reaction to a temporary fluctuation and unnecessary reaction due to a change in setting value SV are avoided to thereby ensure detection of the malfunction.

In malfunction detector 40, conditionally integral computing unit 43 accumulates only successive deviations E of the same sign, so that temporary deviation E and a mere fluctuation are not detected to thereby ensure detection of the malfunction.

Even if successive deviations E of the same sign occur in conditionally integral computing unit 43 in the present embodiment, an increase or a decrease in the deviation is detected by using the relation $|E| \geq |Eold|$ to select execution of integration, so that wrong alarm due to unnecessary accumulation of integrated values S which will occur when fluctuations are settled down is avoided.

Assume that if no selection due to an increase or an decrease in the deviation is made, indicated value PV fluctuates in an allowable range relative to setting value SV (see FIG. 9(A)). In that case, accumulation of integrated values S continues until time $T_{11}$ where the fluctuation returns to substantially 0 (FIG. 9(B)).

Therefore, in order to prevent announcement of an alarm due to such fluctuation, it is necessary to select as threshold value D a value $D_1$ larger than the maximum value Smax of integrated value S due to the previous fluctuation.

However, even if a continuous deviation E due to wrong indication to be detected properly (see FIG. 10(A)) occurs when threshold $D_1$ set thus is used, the time interval between the occurrence of deviation E and time $T_{12}$ when deviation E is added to integrated value S and the resulting valve then reaches threshold $D_1$ (see FIG. 10(B)) is a substantial one, so that giving an alarm would be delayed.

In contrast, in the present embodiment, an increase or a decrease in the deviation due to $|E| \geq |Eold|$ is detected. If deviation E increases, integrated value S is accumulatively increased while if the deviation decreases, no accumulation is made, so that accumulation of integrated values S only continues to time $T_{21}$ where an increase in a similar fluctuation, if any, stops (see FIG. 11(A)). Since the integrated value S takes a maximum value Smax at this time $T_{21}$, a very small value $D_2 < D_1$ may be used as threshold value D.

Therefore, if such threshold $D_2$ is used, an alarm can be given at an early time $T_{22}$ even if essentially continuous deviation E (see FIG. 12(A)) occurs.

By examining an increase or a decrease in the deviation to select execution of integration in the present embodiment, the probability of giving a wrong alarm when fluctuations are settled down is reduced, the sensitivity of detection is improved, and rapid detection of malfunction is ensured.

In order to prevent giving a wrong alarm due to fluctuations, one would conceive that deviation E is added to integrated value S when deviation E starts to increase while deviation E is substracted from the integrated values from the time when the deviation starts to decrease. However, enough accumulation of integrated values S is difficult and detection of the malfunction is delayed if the natural indicated deviation is involved and continuous small fluctuations occur. Thus, the arrangement of the present embodiment is recommendable from a standpoint of stability, reliability and rapidness of malfunction detection.

In addition, in the present embodiment, malfunction interpreting unit 46 calculates the absolute value $|E \times S|$ of the product of integrated value S and deviation E, compares threshold D and absolute value $|E \times S|$ and not integrated value S itself. Therefore, giving a wrong malfunction due to unnecessary accumulation of integrated values S which would be generated due to a complicated behavior of fluctuations is avoided.

Assume that the peak at time $T_{31}$ of a fluctuation in indicated value PV relative to setting value SV is within an allowable range and that the fluctuation is accompanied by a small change at time $T_{33}$ (see FIG. 13(A)). In such a case, conditionally integrating computing unit 43 of the present embodiment accumulates integrated values S during the time when fluctuations tend to increase (between $T_{30}$ and $T_{31}$ and between $T_{32}$ and $T_{33}$) (see FIG. 13(B)). Assuming that malfunction interpreting unit 46 determines integrated value S itself and that threshold D is a value $D_3$ set on the basis of a fluctuation including only a peak with no other changes, a wrong alarm can be given due to an increase in integrated value S due to subsequent changes.

However, malfunction interpreting unit 46 of the present embodiment uses the absolute value $|E \times S|$ of the product of integrated value S and deviation E. The absolute value reflects deviations E at the respective points in time; it is maximum at its peak time $T_{31}$, and the subsequent swings are smaller in correspondence to smaller deviation E at time $T_{33}$ (see FIG. 13(C)).

Therefore, the present embodiment uses the absolute value $|E \times S|$ of the product of integrated value S and deviation E in the determination of malfunction and the corresponding value $D_{14}$ as threshold value D to thereby decrease the probability of giving a wrong malfunction even if the behavior of the fluctuations is complicated and hence to result in secure detection of malfunction.

The present invention is not limited to above embodiment and comprises the following modifications. While abnormality detecting unit 40 performs integration on deviation E from deviation computing unit 41 in accordance with the sign of the deviation and sets integrated value S to 0 when the sign is reversed, simple integration or other accumulating systems may be used. The arrangement of additional elements such as previous deviation memory 44 and previous integrated value memory 45 may be modified when required in the implementation of the present invention.

While it is arranged in the present embodiment that fluctuation monitor 30 starts up abnormality detecting unit 40 in constant cycles as long as there are no changes in setting value SV, fluctuation monitor 30 may be removed. In this case, abnormality detecting unit 40 preferably has the function of automatically starting up itself in constant cycles and stopping its determination only when there are changes in the setting value SV to thereby avoid unnecessary detection due to a change in setting value SV.

While it has been described that conditionally integral computing unit 43 of abnormality detecting unit 40 determines whether the deviation is positive or negative on the basis of whether $Eold \times E > 0$ in the accumulation of integrated values S and whether the deviation increases or decreases on the basis of whether $|E| \geq |Eold|$, the present invention is not limited to this arrangement and determination as to an increase/a decrease in the deviation may be omitted when required.

While it has been described that malfunction interpreting unit 46 of abnormality detecting unit 40 uses the absolute value $|E \times S|$ of the product of the integrated value S and deviation E at the current point in time in the determination of malfunction and compares the absolute value with threshold value D provided correspondingly, the present invention is not limited to this particular arrangement, and the integrated value S at the current point in time may be compared with the corresponding threshold D instead.

Figure 14:
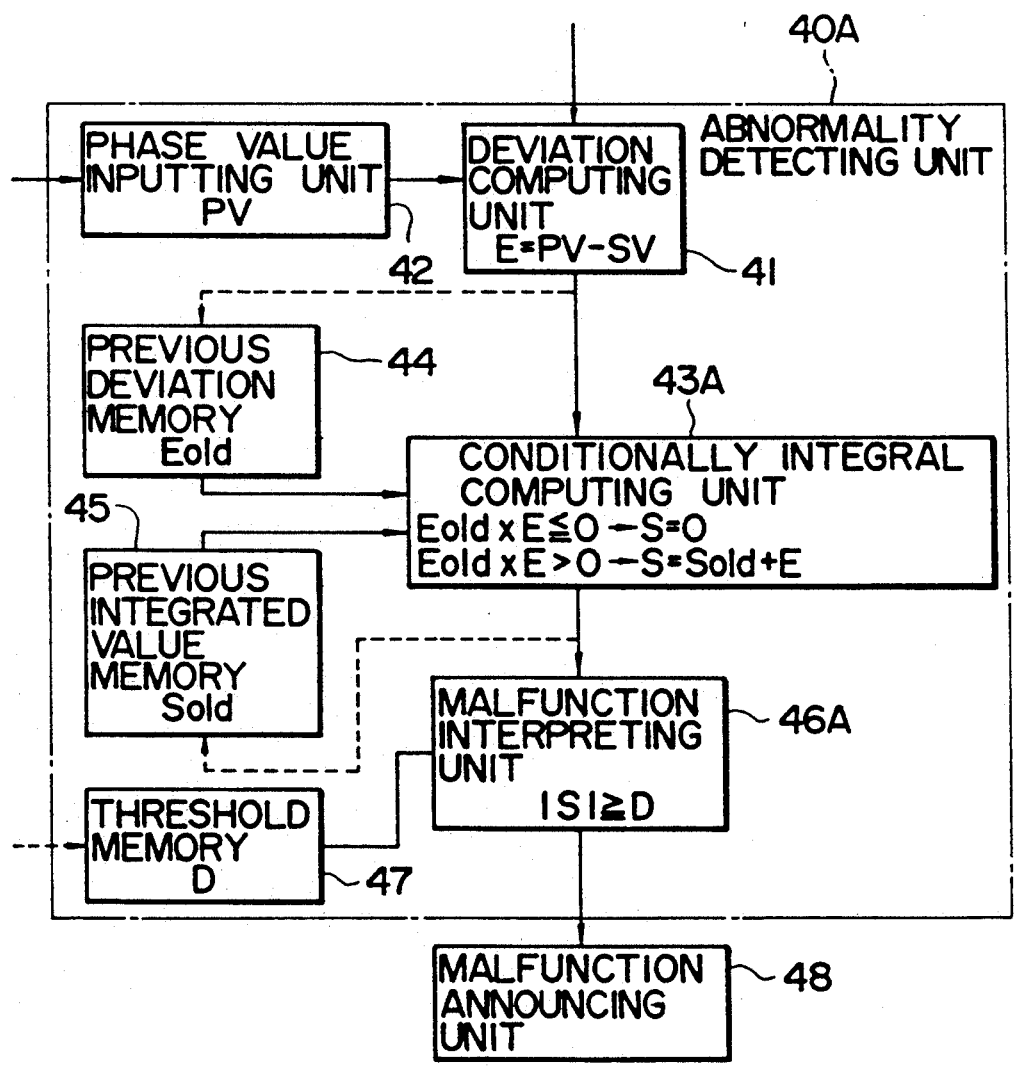
FIG. 14 is a block diagram of another embodiment of the present invention.

FIG. 14 shows another embodiment of the present invention. Abnormality detecting unit 40A of this embodiment has a structure similar to that of abnormality detecting unit 40 of the previous embodiment while conditionally integral computing unit 43A and malfunction interpreting unit 46A of this embodiment differ from those of the previous embodiment. Computing unit 43A of this embodiment accumulates deviation E as it is to integrated value S as long as deviation E and previous deviation Eold have the same sign. Malfunction interpreting unit 46A of the present embodiment compares the integrated value S directly with threshold D for malfunction determination.

The present embodiment performs operations basically similar to those performed by the previous embodiment and produces effects similar to those produced by the previous embodiment. The present embodiment performs no operations corresponding to those at steps P7 and P9 of the FIG. 3 processing of the previous embodiment because of use of conditionally integral computing unit. The present embodiment uses malfunction interpreting unit 46A, so that its processing differs from the contents of processing at step P10 of FIG. 3, and hence effects similar to those produced by the previous embodiment are not expected in this respect. Secure and correct detection of a malfunction is ensured by malfunction determination using integrated value S compared to the conventional device. The use of such configuration is advantageous in view of simplification.

While malfunction detector 21 which monitors level gauge 18 in the previous embodiment has been described, the present invention is applicable to the detection of malfunctions in various controllers. For example, the present invention is applicable to detection of a malfunction of flowmeter 17 provided at the outlet of the previous embodiment. In this case, the deviation between the detected value from flowmeter 17 and the setting value in controller 16 is calculated and integrated and the result is compared with a predetermined threshold. Malfunction detecting unit 21 is not required to be provided outside controller 19, but may be built in the controller.

As described above, according to the present invention, a change in the integrated value due to malfunction is detected in a marked manner using the integrated version of the deviation between the setting value and the phase value, and the influence of fluctuation, etc., is avoided as required, so that a malfunction of the controller is detected rapidly and appropriately.

What is claimed is:

1. A method of operating a controllable device having a control input in response to a setting value, comprising the steps of: generating a control signal which is applied to said control input of said controllable device, said generating step including the steps of periodically sensing a current value of said control signal, determining a difference between said current value and said setting value, and adjusting said control signal so as to reduce the difference; integrating over time respective said differences which have the same sign; and producing a malfunction indication when an integral value from said integrating step exceeds a comparison condition.

2. A method according to claim 1, wherein said integrating step is carried out only for each said difference which has said sign and which is larger than an immediately preceding difference from said determining step.

3. A method according to claim 1, including the step of resetting the integral value from said integrating step to zero when a current difference from said determining step has a sign different from an immediately preceding difference from said determining step.

4. A method of controlling a controllable device having a control input in response to a setting value, comprising the steps of: generating a control signal which is applied to said control input, said generating step including the steps of periodically sensing a current value of said control signal, determining a difference between said current value and said setting value, and adjusting said control signal so as to reduce the difference; integrating over time respective values of said difference; and producing a malfunction indication in response to a predetermined condition, said predetermined condition occurring when a threshold value is determined to be less than the absolute value of a product of the difference from said determining step and the integral value from said integrating step.

5. A method of controlling a controllable device having a control input in response to a setting value, comprising the steps of: generating a control signal which is applied to said control input, said generating step including the steps of periodically sensing a current value of said control signal, determining a difference between said current value and said setting value, and adjusting said control signal so as to reduce said difference; checking for a change in said setting value; integrating over time respective values of said difference when said checking step reveals no change in said setting value, and inhibiting integrating of said difference values when said checking step detects that said setting value has changed; and producing a malfunction indication when the integral value from said integrating step exceeds a comparison condition.

6. An apparatus comprising: means for specifying a setting value; a controllable device having a control input; control means for generating a control signal which is applied to said control input of said controllable device, said control means including first means for periodically sensing a current value of said control signal, for determining a difference between the current value and said setting value, and for adjusting said control signal so as to reduce said difference, second means for integrating, over time, respective values of said difference which have the same sign, and third means for producing a malfunction indication in response to an integral value from said second means being in excess of a comparison condition.

7. An apparatus according to claim 6, wherein said second means include means for effecting said integrating for each said difference having a magnitude greater than the immediately preceding difference and for inhibiting integrating for each said difference having a magnitude less than the magnitude of an immediately preceding difference.

8. An apparatus according to claim 6, wherein said second means include means for resetting the integral value to zero in response to receipt of two successive said differences from said first means which have different signs.

9. An apparatus comprising: means for specifying a setting value; a controllable device having a control input, control means for generating a control signal which is applied to said control input of said controllable device, said generating means including first means for periodically sensing a current value of said control signal, for determining a difference between said current value and said setting value, and for adjusting said control signal in response to said difference so as to reduce said difference; second means for integrating, over time, respective values of said difference; and means for producing a malfunction indication in response to a predetermined condition, said predetermined condition occurring when a predetermined threshold is less than an absolute value of a product of the difference from said first means and an integral value from said second means.

10. An apparatus comprising: means for specifying a setting value; a controllable device having a control input; control means for generating a control signal which is applied to said control input of said controllable device, said control means including means for periodically sensing a current value of said control signal, for determining a difference between said current value and said setting value, and for adjusting said control signal so as to reduce said difference; checking means for detecting a change in said setting value; second means responsive to said checking means for integrating, over time, respective values of said difference when said checking means detects no change in said setting value and for inhibiting integration of said differences in response to detection by said checking means of a change in said setting value; and means for producing a malfunction indication when an integral value from said second means exceeds a comparison condition.

* * * * *